United States Patent [19]

Klanchar et al.

[11] Patent Number: 5,634,341
[45] Date of Patent: Jun. 3, 1997

[54] SYSTEM FOR GENERATING HYDROGEN

[75] Inventors: Martin Klanchar; Thomas G. Hughes, both of State College, Pa.

[73] Assignee: The Penn State Research Foundation, University Park, Pa.

[21] Appl. No.: 566,486

[22] Filed: Dec. 4, 1995

Related U.S. Application Data

[63] Continuation of Ser. No. 189,525, Jan. 31, 1994, abandoned.
[51] Int. Cl.$^6$ .................... C01B 3/08; F01K 25/06
[52] U.S. Cl. .................... 60/673; 60/39.12; 423/657; 423/DIG. 12; 429/20
[58] Field of Search .................... 60/673; 423/657, 423/DIG. 12

[56] References Cited

U.S. PATENT DOCUMENTS

| | | |
|---|---|---|
| 2,706,890 | 4/1955 | Schmidt . |
| 3,353,349 | 11/1967 | Percival . |
| 3,413,801 | 12/1968 | Meijer et al. . |
| 3,508,394 | 4/1970 | De Nagel et al. . |
| 3,821,362 | 6/1974 | Spack .................... 423/657 |
| 3,943,719 | 3/1976 | Terry et al. . |
| 3,975,913 | 8/1976 | Erickson . |
| 3,985,866 | 10/1976 | Oda et al. .................... 423/657 |
| 4,050,250 | 9/1977 | Danis . |
| 4,643,166 | 2/1987 | Hubele et al. . |
| 4,698,974 | 10/1987 | Wood . |
| 4,730,601 | 3/1988 | Hubele et al. . |
| 4,851,722 | 7/1989 | Zauderer . |
| 5,117,635 | 6/1992 | Blau . |

FOREIGN PATENT DOCUMENTS 27626  7/1977  Japan .................... 423/657

*Primary Examiner*—Wayne Langel
*Attorney, Agent, or Firm*—Thomas J. Monahan

[57] ABSTRACT

A process and apparatus are disclosed for generating hydrogen gas from a charge of fuel selected from the group consisting of lithium and alloys of lithium and aluminum. The charge of fuel is placed into an enclosed vessel, then heated until it is molten. A reactant consisting of water is introduced into the vessel, as by spraying from a nozzle, for reaction with the charge of fuel resulting in the production of hydrogen gas and heat which are withdrawn from the vessel. Prior to initiation of the process, an inert gas atmosphere, such as argon, may be imparted to the interior of the vessel. A sufficiently large mass flow of the reactant through the nozzle is maintained to assure that there be no diminution of flow resulting from the formation on the nozzle of fuel and chemical compounds of the fuel. Optimum charges of the fuel are application specific and the ranges of the constituents are dependent upon the particular use of the system. The process and apparatus of the invention may be incorporated into a Rankine cycle engine or into a hydrogen oxygen fuel cell system.

9 Claims, 4 Drawing Sheets ns among the chemical reaction for utilization in a steam or vapor pressure Rankine cycle engine. Such a crust on the heat transfer surfaces will ordinarily have a relatively high insulation value in comparison with the molten fuel. As a result, the crusted reaction products themselves progressively inhibit heat transfer from the reaction chamber to the engine.

5,634,341

SYSTEM FOR GENERATING HYDROGEN

GOVERNMENT SPONSORSHIP

This application is a continuation of application Ser. No. 08/189,525 filed on Jan. 31, 1994, abandoned.

This invention was made with Government support under Contract N00039-88-C-0051 awarded by the U.S. Department of the Navy. The Government has certain rights in this invention.

BACKGROUND OF THE INVENTION

1. Field of the Invention

The present invention relates generally to hydrogen gas generating systems and, more particularly, to a system for the generation of hydrogen gas resulting from the reaction of molten lithium or lithium alloy fuel with water in a contained vessel.

2. Discussion of the Prior Art

The hydrogen gas generator reactor of the present invention is one of the key energy producing components of a Rankine cycle vapor pressure or steam engine, for example, which obtains its driving heat energy from a chemical reaction other than the usual combustion of fuel with oxygen from the air. The theoretical possibility of utilizing the reaction energy of a reactive metal fuel such as aluminum, magnesium or lithium and alloys or hydrides of these and similar reactants, with an "oxidizer" such as hydrogen peroxide, Freons, sulfur hexaflouride, water and others, has been recognized for many years. However, the technical difficulties and conflicts standing between a theoretical construction of such a power system and a practical apparatus which is functional outside of the laboratory are legion.

By way of example, many of the fuel-reactant combinations proposed in the past have required that the fuel be raised above ordinary ambient temperatures in order to permit reaction with the reactant. Such a heating requirement necessitates that some heating means, such as electrical heating coils or pyrotechnic chemicals be provided. In the former case, a significant start-up delay is incurred while a portion or all of the fuel is raised to reaction temperature. In the latter case, the pyrotechnic chemicals, which are or may be considered to be low velocity explosives, present the possibility of damaging the interior of the reaction chamber and escape of highly reactive or toxic fuels. Such pyrotechnic heating chemicals also frequently produce a quantity of gaseous reaction products which must be contained within the reaction chamber, or else vented therefrom while preventing loss of fuel.

Another undesirable aspect of many previously proposed fuel-reactant systems is that intermediate reaction products or end reaction products are formed which on the one hand inhibit further progress of the reaction between the fuel and reactant or, on the other hand, freeze at a temperature higher than the desired reaction chamber temperature. In the one case, complex structures and methods have been proposed to cure the shortcoming by removing the intermediate or final reaction product from the reaction chamber. Alternatively, only a portion of the fuel could be brought into contact with the reactant so that reaction products could not contaminate the remaining fuel. Again, complexity is increased.

The problem of the reaction intermediates or final products freezing at too high a temperature presents the difficulty that the reaction chamber may soon become filled with a "slush" of frozen reaction products in a slurry of molten fuel. Similarly, the high-freezing constituents present in the reaction chamber may form a "frost" or crust on the coolest surfaces present. These cool surfaces will ordinarily be heat transfer surfaces where it is desired to transfer heat from the chemical reaction for utilization in a steam or vapor pressure Rankine cycle engine. Such a crust on the heat transfer surfaces will ordinarily have a relatively high insulation value in comparison with the molten fuel. As a result, the crusted reaction products themselves progressively inhibit heat transfer from the reaction chamber to the engine.

One approach aimed at solving the problem just mentioned is disclosed in U.S. Pat. No. 4,698,974 to Wood. In the Wood disclosure, a fuel is reacted with water in the absence of oxygen gas to produce heat and hydrogen gas. The heat from this reaction is sued to produce water steam. The hydrogen gas is burned with oxygen gas in a separate second reaction chamber to produce super heated steam. The steam from the first reaction chamber is used as a coolant and diluent in the second reaction chamber so that steam flowing from the second reaction chamber to a turbine, or other expander, has a metallurgically acceptable temperature.

A shortcoming of the Wood invention, however, is that a hydrogen gas bearing reaction intermediate is formed which initially partially prevents the evolution of the hydrogen gas from the first reaction chamber. As the reaction progresses, the reaction intermediate further reacts to release the bound hydrogen. The result is that over the period of the reaction, the rate of hydrogen gas production is at first relatively low, reaches a stable plateau, and then raises above the plateau as the fuel supply is consumed.

A consequence of this nonuniform rate of hydrogen gas production is that the power output of the Rankine cycle steam engine is relatively low initially and cannot be increased until the hydrogen gas production rate of the chemical reaction chamber increases. Understandably, this sluggish initial power output of such a system is undesirable in almost every prospective application. Additionally, the nonuniform rate of hydrogen gas production creates many difficulties in controlling the power output level of the Rankine cycle engine.

An improvement on the Wood system is presented in U.S. Pat. Nos. 4,643,166 and 4,730,601 to Hubele et al which, according to one aspect, provides a two-part fuel composition including a first or main fuel part of magnesium and aluminum in a molar ratio of 1:2, respectively. The second or starter fuel part is composed of lithium hydride, magnesium and aluminum in equal molar ratio. On a weight basis, the starting fuel composition and main fuel composition are presented at a ratio of about 1:4. In the reaction chamber, the above-outlined fuel is present in the form of prealloyed powders produced, for example, from condensed vaporized or atomized metal. The reaction chamber structure provides in addition to heat transfer means, a means for introducing water into the chamber for reaction with the fuel.

In one embodiment, the means for introducing water comprises a manifold with foraminous distribution tubes depending in the fuel. The distribution tubes are immediately surrounded by a comparatively thin layer of the starting fuel part. The main fuel part is received within the reaction chamber around the distribution tubes and layer of starting fuel part.

In another embodiment, the main fuel part is disposed in a lower portion of the reaction chamber. In an upper portion of the reaction chamber is disposed an appropriate quantity of the starting fuel part and, in this instance, the reaction chamber includes a water inlet nozzle disposed in an upper part of the reaction chamber above both the starting and main fuel parts. Preferably, the water nozzle is separated from the fuel during operation of the reaction chamber and engine.

A primary advantage of the patented system as mentioned therein is the stated absence of any need or requirement to provide fuel preheating before the reaction chamber is operational. According to a further stated advantage, the introduction of simple water is all that is required to initiate operation of the reaction chamber to produce both heat and a supply of hydrogen. This latter feature is said to be of particular advantage when the invention is sued in connection with a water borne vehicle.

However, the Hubele et al. invention exhibits a number of drawbacks. Specifically, the disclosures in the Hubele et al. patents relate the use of two separate and distinct fuels and, furthermore, do not require that the fuels be raised in temperature to a molten mass as does the present invention. Indeed, those patents stress the desirability of a reaction which is performed at common ambient temperatures and which do not require preheating or pyrotechnic chemicals to be used in starting the reaction. While the Hubele et al. patents imply that there is a strategic advantage to starting at room temperature and to reacting a starting charge first and, subsequently, the main fuel, they also state that the entire fuel mass will melt in very short order. In effect, what will occur is that the operator of the Hubele et al. system will not be able to control the local reaction to first use the start charge with the result that a molten mass will be achieved with only one fuel, not two, and the stated claim of a regulated, flat, hydrogen gas production will not be achieved.

Other patents of interest include U.S. Pat. No. 3,353,349 to Percival and U.S. Pat. No. 5,117,635 to Blau. Percival discloses a closed cycle thermal engine provided with a combustion system for heating the working gas thereof. The combustion system produces nongaseous byproducts and operates at substantially constant volume by employing molten lithium or sodium as a fuel and certain gaseous nonhydrogen containing Freon-type fluorocarbon compounds as the oxidizer. Blau describes an open-cycle Rankine steam engine. One of the energy-producing components of the engine does utilize molten lithium as a fuel. However, hydrogen gas is not generated anywhere within the system.

SUMMARY OF THE INVENTION

It was in light of the prior art as just described that the present invention was conceived and has now been reduced to practice. The present invention, then, relates to a process and to apparatus for generating hydrogen gas from a charge of fuel selected from the group consisting of lithium, and alloys of lithium and aluminum, and alloys of lithium and aluminum and lithium hydride, and alloys of lithium and lithium hydride. These alloys were selected primarily because their reaction with water produces relatively large amounts of hydrogen gas and heat per storage (reactor vessel) volume. In addition, the kinetics of the reaction are very fast—essentially instant and irreversible. Also, post-run cleanout of the vessel is relatively safe and easy since the remaining products of reaction (metal oxides) are typically nontoxic and water soluble.

The charge of fuel is placed into an enclosed vessel, then heated until it is molten. A reactant consisting of water is introduced into the vessel, as by spraying from a nozzle, for reaction with the charge of fuel resulting in the production of hydrogen gas and heat which are withdrawn from the vessel. Prior to initiation of the process, an inert gas atmosphere, such as argon, may be imparted to the interior of the vessel. A sufficiently large mass flow of the reactant through the nozzle is maintained to assure that there be no diminution of flow resulting from the formation on the nozzle of fuel and chemical products of the fuel. Optimum charges of the fuel are application specific and the ranges of the constituents are dependent upon the particular use of the system. The process and apparatus of the invention may be incorporated into a Rankine cycle engine or into a hydrogen oxygen fuel cell system.

A primary object of the present invention, then, is to provide a system for the production of hydrogen gas which is, compact, clean, efficient, controllable, and economical.

Another object of the present invention is to provide such a system which generates hydrogen from a charge of fuel selected from a group consisting of lithium, and alloys of lithium and aluminum, and alloys of lithium and aluminum and lithium hydride, and alloys of lithium and lithium hydride.

Another object of the present invention is the provision of such a system which can be utilized in a number of applications, in one instance as a component for a Rankine cycle engine and, in another instance, as a component in a hydrogen oxygen fuel cell system.

Yet a further object of the invention is to provide such a system in which a maximum output of energy is achieved from a given volume of fuel.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

DETAILED DESCRIPTION OF THE PREFERRED EMBODIMENT

Figure 2:
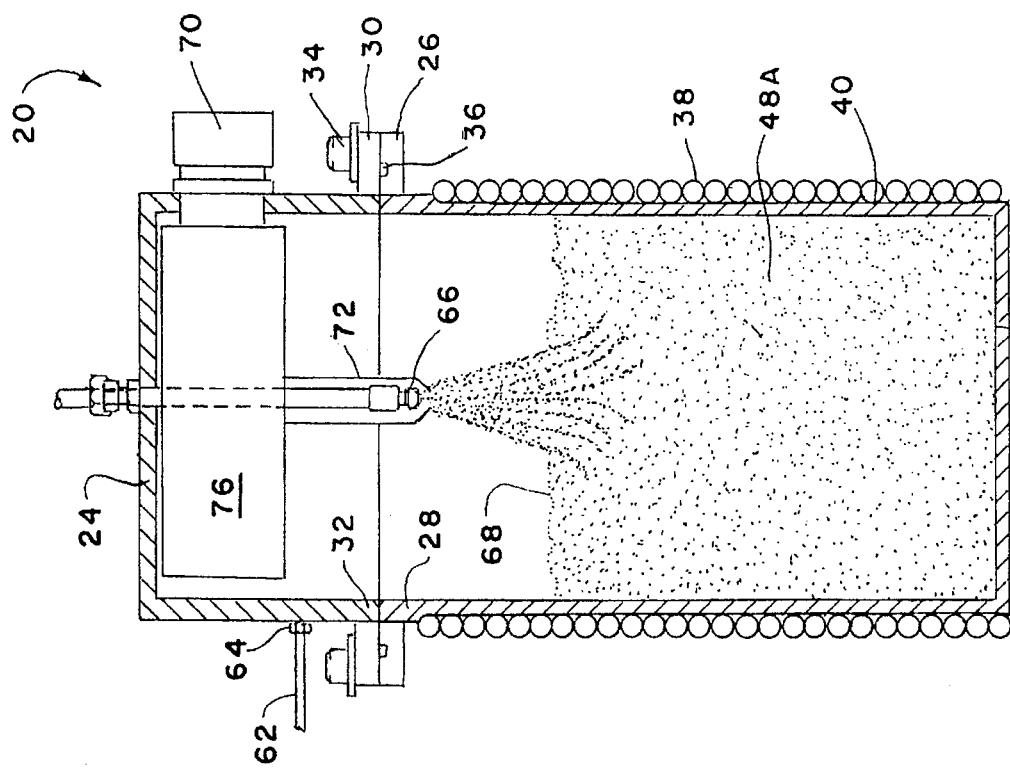
FIG. 2 is a cross section view, in elevation, taken generally along line 2—2 in FIG. 1.
Figure 1:
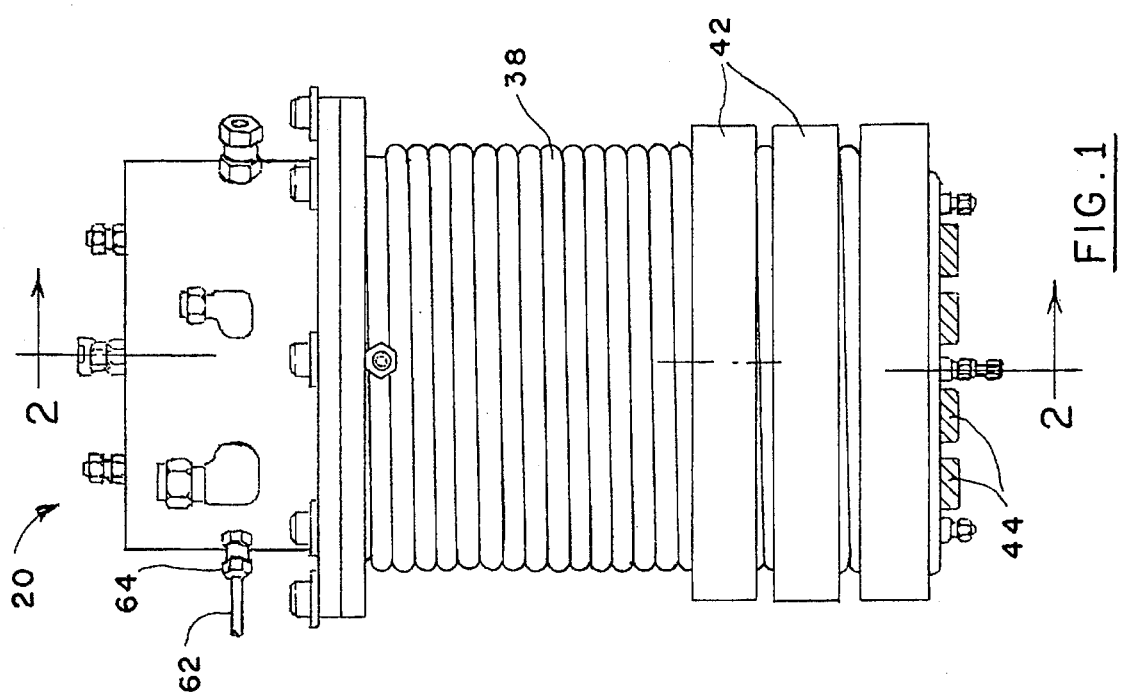
FIG. 1 is a side elevation view illustrating a reaction vessel embodying the present invention.
Figure 4:
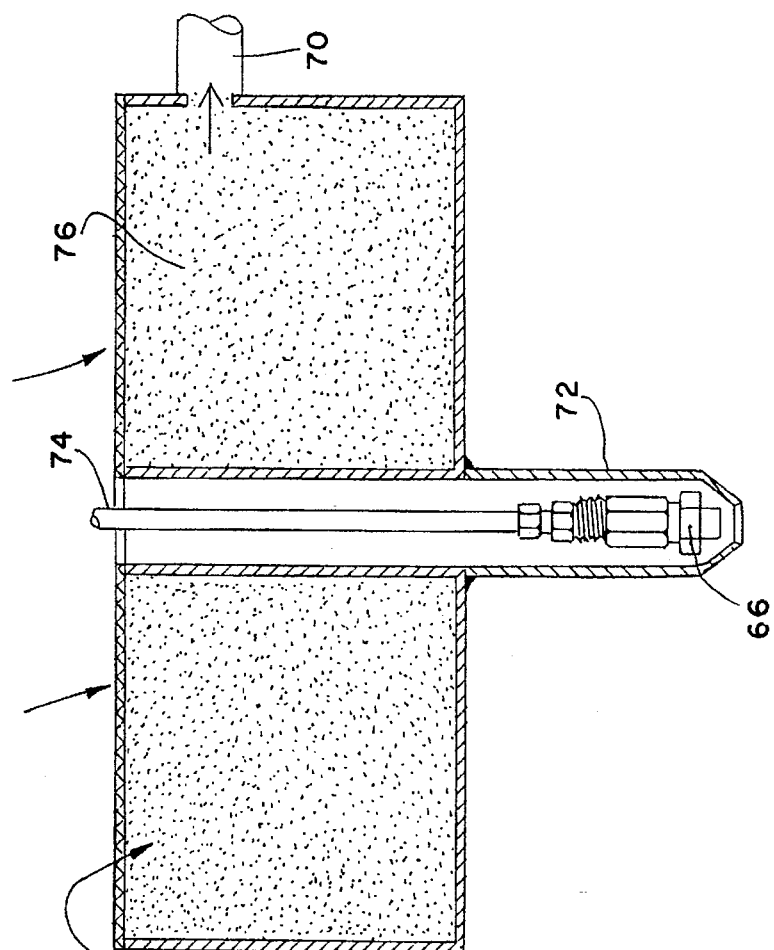
FIG. 4 is a detail cross section view to provide more detail of a component illustrated in FIG. 2.

Turn now to FIGS. 1 and 2 which illustrate a reaction vessel 20 which can be utilized to generate hydrogen gas according to the present invention. The reaction vessel 20 is composed of a material which is relatively inert, that is, would not take part in any reactions necessary for the generation of hydrogen gas. Appropriate materials include various stainless steels and other metallic superalloys. In any event, the reaction vessel 20 comprises a base container 22 which is for the purpose of supporting the reactant materials and a lid 24 which matingly connects with the base container to sealingly enclose the reaction vessel. The base container 22 and lid, 24 are preferably generally cylindrical. The former has an integral annular flange 26 adjacent its uppermost rim 28 and the lid 24 has an integral annular flange 30 adjacent its lowermost rim 32. The flanges 26, 30 are matingly engageable and can be locked together by a plurality of circumferentially spaced fasteners 34. Fluid tight integrity between the flanges 26, 30 is achieved by reason of a circumferentially extending O-ring seal 36 interposed between the flanges.

The reaction vessel 20 thus described is, indeed, a pressure vessel capable of safely containing reactions which develop operating pressures in excess of 100 psia.

Cooling plumbing is provided in the form of spiral tubing 38 which envelopes the peripheral external surface 40 of the base container 22. It is preferably welded into place and enables flow of cooling water at a rapid rate from an ambient source from the uppermost regions of the base container to its lowermost regions.

The reaction vessel 20 also has provision for heating its interior. This may be achieved in a number of different ways. For example, a propane burner (not shown) may be positioned beneath the base container 22 and ignited when appropriate. In another instance, electrical band heaters 42, 44 may be utilized. In this instance, a plurality of cylindrical band heaters 42 may be suitably mounted on the peripheral exterior of the base container 22 at its lowermost regions. Similarly, strip heaters 44 are suitably mounted to a bottom wall 46 of the base container 22.

Figure 3:
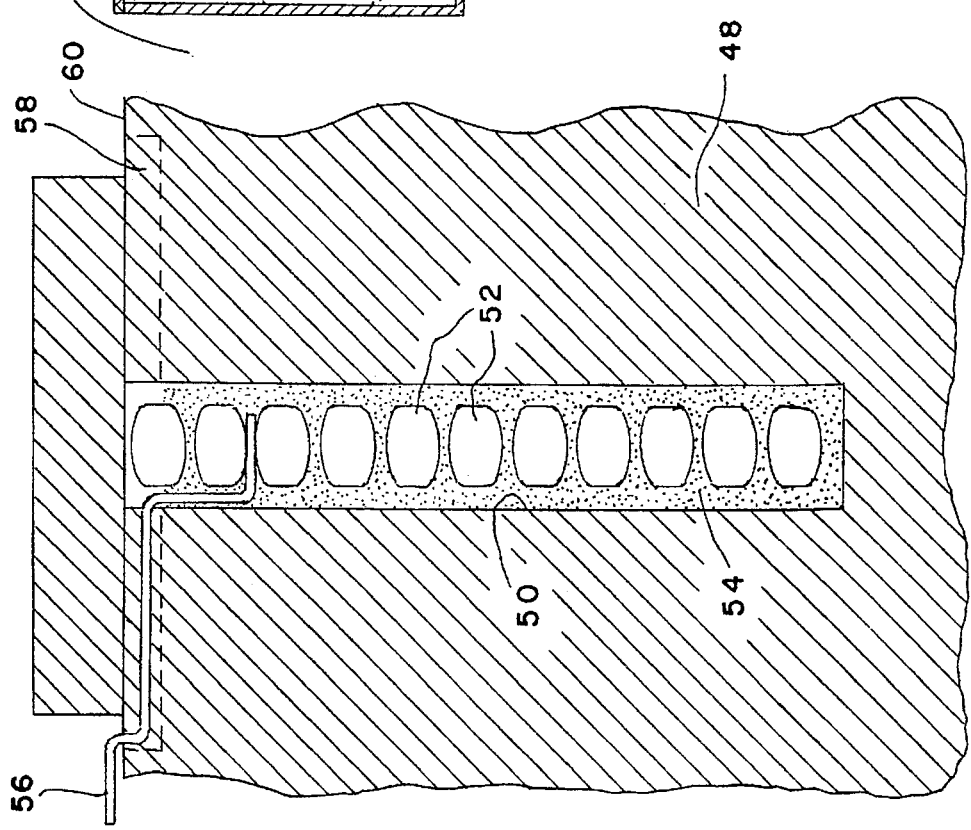
FIG. 3 is a detail cross section view of a pyrotechnic arrangement for heating fuel in the reaction vessel of FIGS. 1 and 2.

Yet another manner of heating, as generally illustrated in FIG. 3 may be employed either by itself or in conjunction with one of the heating techniques just described. In this instance, solid fuel 48, typically in block form, placed in the base container 22, is provided with its own pyrotechnic devices which provide considerable amounts of heat in a nearly instantaneous manner. In this instance, a plurality of core holes 50 are formed into the block of the fuel 48. A plurality of Alclo brand (a mixture of aluminum and potassium perchlorate) pellets 52 are inserted into each core hole 50. The pellets are spaced apart and supported in a bed or matrix 54 of thermite, also known as a mixture of aluminum and copper oxide.

An igniter wire 56 extends from a region beyond the fuel block 48 and, indeed, extends through the interface between the lid 24 and the base container 22 to a location outside of reaction vessel 20. An innermost end of the igniter wire 56 is preferably positioned between a pair of the pellets 52 within the bed 54 of thermite. A vent groove 58 may be provided at an uppermost surface 60 of the fuel block 48 in order to vent the combustion products of the pyrotechnic charge just described.

The block of fuel 48, for purposes of the invention, is selected from the group consisting of lithium, and alloys of lithium and aluminum, and alloys of lithium and aluminum and lithium hydride, and alloys of lithium and lithium hydride. In each instance, a wide range of compositions of the components of the fuel may be utilized when other than 100% lithium. The lithium and lithium-alloy fuel mixtures provide exceptional energy density in terms of hydrogen and heat production. The exact composition of the alloy fuel is determined according to the hydrogen and heat generation requirements of the Rankine or hydrogen oxygen fuel cell systems.

Prior to operation of the reaction vessel 20, it may be desirable to purge the interior of the vessel, after it is sealed, with an inert gas for the purpose of removing oxygen which, if present, would have an undesirable effect on the reaction. For this purpose, a line 62 is illustrated in FIGS. 1 and 2 connected via a fitting 64 to the lid 24 for introducing a pressurized inert gas such as argon to the interior of the reaction vessel 20. Flow of the inert gas is not continuous. When water injection into the vessel is begun, flow of the inert gas is terminated.

While purging continues, the heating operation begins using any, or any combination, of the heating mechanisms already described, or any other manner of heating which may be suitable for the purpose. Heating continues until the fuel is molten which occurs at approximately 600° F. At this point, reactant consisting of water is introduced into the vessel via a nozzle 66 directed at a surface 68 of the now molten fuel 48A as illustrated in FIG. 2.

Indeed, the nozzle 66 is so directed at the surface of the molten fuel 48A that the water spray penetrates the surface and causes agitation of the mass of the molten fuel. The reaction of water and fuel results in the production of hydrogen gas and heat. Because the reaction between the fuel and the reactant, or water, is an exothermic one, once the reaction has begun, it is no longer necessary to continue with the operation of the heaters 42, 44 and their operation is then discontinued. Heat is withdrawn from the reaction vessel 20 by means of water flow through the spiral tubing 38, and exhaust tubing 70 is employed for withdrawing the hydrogen gas from the interior of the reaction vessel 20.

Because of the intense heat within the reaction vessel, as well as the violent agitation caused by the reaction, a protective cylindrical shield 72, preferably made of stainless steel, surrounds a water inlet conduit 74 and the nozzle 66 to prevent their degradation.

Since the reaction within the vessel 20 is vigorous and combustion-like, the hydrogen gas so produced leaves the vessel via the exhaust tubing 70 at a very high velocity. This causes entrainment of unreacted fuel and solid products, for example, oxides and hydroxides of lithium and aluminum (in the event aluminum is in the starting fuel) in the gas stream which must be removed before it leaves the vessel. For this reason, it is important to provide a filter 76 which is integral with the cylindrical shield 72 and is interposed between the interior of the vessel and the exhaust tubing 70. The hydrogen gas which exits the reaction vessel 20 is thereby assured of having a high level of purity.

Figure 5:
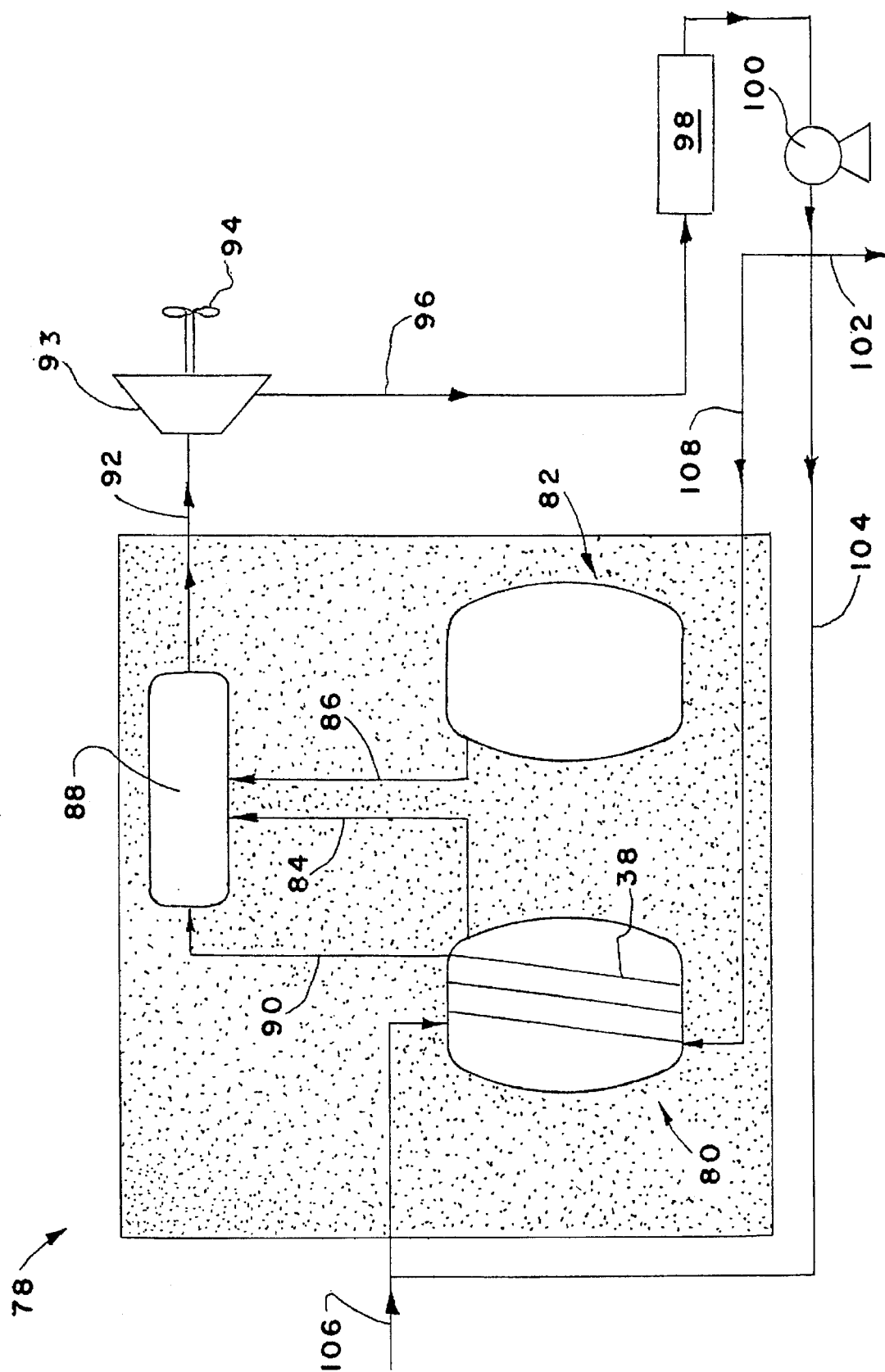
FIG. 5 is a schematic representation of a Rankine cycle engine utilizing the hydrogen generating reaction vessel of FIGS. 1 and 2.

The reaction vessel 20 for generating hydrogen can be employed in a variety of systems. In one instance, for example, it may have application in a Rankine steam cycle power plant 78 used for underwater propulsion purposes. Such a system is illustrated in FIG. 5. It comprises a hydrogen generator 80 generally of the construction of the reaction vessel 20 and an oxygen generator 82 which may be, for example, generally of the construction disclosed in commonly assigned copending application Ser. No. 08/132, 021 and filed Oct. 5, 1993, now U.S. Pat. No. 5,376,352. As indicated in FIG. 5, hydrogen gas from the hydrogen generator 80 and oxygen gas from the oxygen generator 82 flow via lines 84, 86, respectively, to a burner 88, along with low temperature steam which travels via a line 90 from the spiral tubing 38 in the burner 88. The hydrogen gas and the oxygen gas are combusted to generate super heated steam which travels via line 92 to a turbine 93 which produces power, for example, to drive a shaft and propeller 94. Exhaust lower energy steam is directed from the turbine 93 via line 96 to a condenser 98 which operates to change its state into water. A feed water pump 100 operates to cycle the water through the power plant. Excess water from the feed water pump may be dumped via a line 102 while reactant water may be delivered to the hydrogen generator 80 via a line 104 along with starting water from a line 106, and cooling water may be delivered to the spiral tubing 38 via a line 108.

Figure 6:
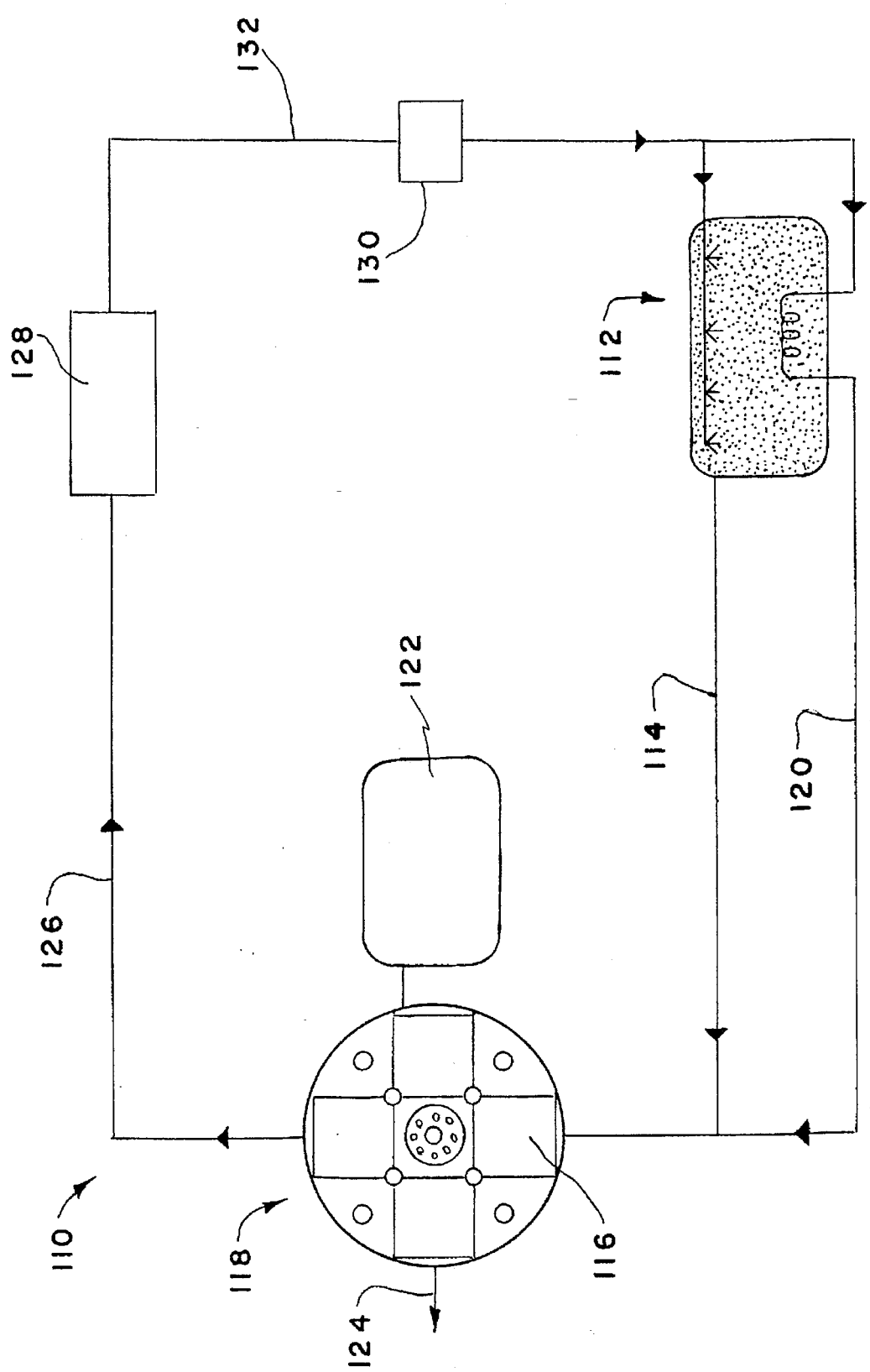
FIG. 6 is a schematic representation of a hydrogen oxygen fuel cell system utilizing the hydrogen generating reaction vessel of FIGS. 1 and 2.

In another instance, as illustrated in FIG. 6, a hydrogen oxygen fuel cell system 110 may utilize a hydrogen generator 112 which is substantially of the construction of the reaction vessel 20. In this instance, hydrogen gas generated within the generator 112 is delivered via a line 114 to a plurality of stacks 116 within a solid oxide fuel cell 118. Water heated by the hydrogen generator 112 may also be delivered to the stacks 116 via a line 120 to wet the solid oxide electrodes to maintain ionic conductivity. The steam produced in the hydrogen generator is delivered to the fuel cell stacks where it wets the solid oxide electrodes to maintain ionic conductivity. An oxygen generator 122, which may be similar to the oxygen generator 82 and of the type disclosed in U.S. Pat. No. 5,376,352, mentioned above, serves to provide oxygen gas to the fuel cell 118. The fuel cell 118 is operable to generate electricity and to deliver it externally as schematically represented by an arrow 124. Water produced as a result of the electrochemical reaction of the hydrogen gas and oxygen gas is withdrawn from the fuel cell 118 and delivered via a line 126 to a heat exchanger 128 which reduces the temperature of the water to an ambient level. A feed water pump 130 in a line 132 is operable for cycling the water through the fuel cell system 110.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A process for generating hydrogen gas comprising the steps of:
   (a) containing a charge of solid fuel selected from the group consisting of lithium, and alloys of lithium and aluminum, and alloys of lithium and aluminum and lithium hydride, and alloys of lithium and lithium hydride in an enclosed vessel defining a single chamber;
   (b) sealing the vessel against further introduction of the fuel into the vessel;
   (c) heating the charge of solid fuel within the vessel to a temperature at which the fuel is a molten mass and exhibits a surface;
   (d) introducing to the vessel for reaction with the molten mass of fuel within the vessel a reactant consisting of water resulting in the production of hydrogen gas and heat, said step of introducing a reactant including the step of spraying the reactant through a nozzle directed at the surface of the molten fuel such that the reactant penetrates the surface thereof and causes agitation of the molten mass of fuel; and
   (e) withdrawing the hydrogen gas and heat from the vessel.

2. A process for generating hydrogen gas as set forth in claim 1 including the step of:
   (e) purging the interior of the vessel with an inert gas.

3. A process for generating hydrogen gas as set forth in claim 2
   wherein step (e) includes the step of:
   (f) imparting an argon atmosphere to the interior of the vessel.

4. A process for generating hydrogen gas as set forth in claim 1
   wherein step (c) includes the step of:
   (f) maintaining a sufficiently large mass flow of the reactant through the nozzle to assure no diminution thereof resulting from the formation thereon of fuel and chemical compounds of the fuel.

5. A process for generating hydrogen gas as set forth in claim 1
   wherein step (d) includes the step of:
   (e) filtering the hydrogen gas before it exits the vessel to remove therefrom oxides and hydroxides of lithium and aluminum which were produced in step (c).

6. A process of operating a Rankine cycle engine comprising the steps of:
   (a) containing a charge of solid fuel selected from the group consisting of lithium and alloys of lithium and aluminum and alloys of lithium and aluminum and lithium hydride and alloys of lithium and lithium hydride in an enclosed vessel defining a single chamber;
   (b) sealing the vessel against further introduction of the fuel in the vessel;
   (c) heating the charge of solid fuel within the vessel to a temperature at which the fuel is molten and exhibits a surface;
   (d) introducing to the vessel for reaction with the molten mass of fuel within the vessel a reactant consisting of water resulting in the production of hydrogen gas and heat, said step of introducing a reactant including the step of spraying the reactant through a nozzle directed at the surface of the molten fuel such that the reactant penetrates the surface thereof and causes agitation of the molten mass of fuel;
   (e) withdrawing the hydrogen gas from the vessel;
   (f) introducing into a burner the hydrogen gas withdrawn from the vessel according to step (e) and oxygen gas from a separate source;
   (g) combusting the hydrogen gas and the oxygen gas in the burner creating products of combustion; and
   (h) withdrawing the products of combustion from the burner and directing them through a turbine for driving the turbine.

7. A process for generating hydrogen gas as set forth in claim 6 including the step of:
   (e) purging the interior of the vessel with an inert gas.

8. A process for generating hydrogen gas as set forth in claim 7
   wherein step (e) includes the step of:
   (f) imparting an argon atmosphere to the interior of the vessel.

9. A process for generating hydrogen gas as set forth in claim 6
   wherein step (c) includes the step of:
   (f) maintaining a sufficiently large mass flow of the reactant through the nozzle to assure no diminution thereof resulting from the formation thereon of fuel and chemical compounds of the fuel.

* * * * *